(12) United States Patent
de León

(10) Patent No.: US 11,609,401 B2
(45) Date of Patent: Mar. 21, 2023

(54) BREAKOUT ASSEMBLY FOR FIBER OPTIC CABLE

(71) Applicant: CommScope Technologies LLC, Hickory, NC (US)

(72) Inventor: Oscar Bran de León, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/340,695

(22) Filed: Jun. 7, 2021

(65) Prior Publication Data

US 2021/0396945 A1 Dec. 23, 2021

Related U.S. Application Data

(60) Provisional application No. 63/040,178, filed on Jun. 17, 2020.

(51) Int. Cl.
*G02B 6/44* (2006.01)
*G02B 6/255* (2006.01)

(52) U.S. Cl.
CPC ........... *G02B 6/4472* (2013.01); *G02B 6/255* (2013.01)

(58) Field of Classification Search
None
See application file for complete search history.

(56) References Cited

U.S. PATENT DOCUMENTS

| | | | | |
|---|---|---|---|---|
| 5,097,529 A * | 3/1992 | Cobb | ................... | G02B 6/4442 385/135 |
| 5,231,688 A * | 7/1993 | Zimmer | ............... | G02B 6/4471 385/139 |
| 6,389,214 B1 | 5/2002 | Smith et al. | | |
| 8,958,673 B2 * | 2/2015 | Cline | ................... | G02B 6/4477 385/103 |
| 9,235,021 B2 * | 1/2016 | Islam | ................... | G02B 6/4471 |
| 10,928,592 B2 * | 2/2021 | Petersen | .............. | G02B 6/4454 |
| 11,131,821 B2 * | 9/2021 | Petersen | .............. | G02B 6/4472 |
| 2003/0010519 A1 * | 1/2003 | Pieck | ................... | G02B 6/4428 174/659 |

(Continued)

OTHER PUBLICATIONS

"International Search Report and Written Opinion corresponding to International Application No. PCT/US2021/036079 dated Sep. 27, 2021".

*Primary Examiner* — Rhonda S Peace
(74) *Attorney, Agent, or Firm* — Myers Bigel, P.A.

(57) ABSTRACT

A fiber optic fanout assembly includes: a fiber optic trunk cable comprising a plurality of optical fibers within a surrounding jacket; a fanout housing with an internal bore and rear and front end portions, the fanout housing receiving the optical fibers from the trunk cable within the internal bore though the rear end portion; a plurality of furcation tubes, each containing one or more of the optical fibers; a first sealing structure that creates a first seal between the fanout housing and the jacket of the fiber optic cable; a first disk having a plurality of holes, the first disk mounted to the front end portion of the fanout housing, wherein the furcation tubes and optical fibers residing therein are inserted into the holes in the first disk; and a plurality of second sealing structures, each of which provides a second seal between the furcation tubes and the first disk.

20 Claims, 5 Drawing Sheets

(56) References Cited

U.S. PATENT DOCUMENTS

| | | | |
|---|---|---|---|
| 2012/0230636 A1* | 9/2012 | Blockley | G02B 6/4472 |
| | | | 385/59 |
| 2015/0270654 A1 | 9/2015 | Islam et al. | |
| 2015/0331213 A1 | 11/2015 | Wimmer | |
| 2017/0102506 A1 | 4/2017 | Newbury et al. | |
| 2019/0293892 A1 | 9/2019 | Wentworth et al. | |
| 2021/0396945 A1* | 12/2021 | de León | G02B 6/4472 |

* cited by examiner

BREAKOUT ASSEMBLY FOR FIBER OPTIC CABLE

RELATED APPLICATION

The present application claims priority from and the benefit of U.S. Provisional Patent Application No. 63/040,178, filed Jun. 17, 2020, the disclosure of which is hereby incorporated herein in its entirety.

FIELD OF THE INVENTION

The present invention relates generally to power and signal distribution, and more particularly to distribution from hybrid cables.

BACKGROUND

Delivering power and data in wireless infrastructure typically involves the use of cable. In many instances, a single trunk cable can be used to supply multiple sectors, thereby eliminating multiple runs of cable. However, in order to use a single trunk cable, at some point the trunk cable must transition to jumper cables. For fiber optic cables, an enclosure may be used that transitions the multiple optical fibers of the trunk cable to individual optical fibers in the jumper cables. Typically this transition entails separating the optical fibers, removing any protective cladding or jacketing, and routing the individual optical fibers into furcation tubes or the like that exit the enclosure. The individual fibers are terminated with connectors that can then be attached to electronic equipment, such as remote radio heads or active antennas.

In many instances, the optical fibers of the trunk cables are spliced to optical fibers in the furcation tubes. As such, the spliced areas are typically protected with splice protectors or the like, and are often further protected with a protective compound such as epoxy.

It may be desirable to provide enclosures that facilitate the operation and reliability of the device.

SUMMARY

As a first aspect, embodiments of the invention are directed to a fiber optic fanout assembly. The fiber optic assembly comprises: a fiber optic trunk cable comprising a plurality of optical fibers within a surrounding jacket; a fanout housing with an internal bore and rear and front end portions, the fanout housing receiving the optical fibers from the fiber optic trunk cable within the internal bore though the rear end portion; a plurality of furcation tubes, each containing one or more of the optical fibers; a first sealing structure that creates a first seal between the fanout housing and the jacket of the fiber optic trunk cable; a first disk having a plurality of holes, the first disk mounted to the front end portion of the fanout housing, wherein the furcation tubes and optical fibers residing therein are inserted into the holes in the first disk; and a plurality of second sealing structures, each of which provides a second seal between the furcation tubes and the first disk.

As a second aspect, embodiments of the invention are a fiber optic fanout assembly comprising: a fiber optic trunk cable comprising a plurality of optical fibers within a surrounding jacket; a fanout housing with an internal bore and rear and front end portions, the fanout housing receiving the optical fibers from the fiber optic trunk cable within the internal bore though the rear end portion; a plurality of furcation tubes, each containing one or more of the optical fibers; a first sealing structure that creates a first seal between the fanout housing and the jacket of the fiber optic trunk cable; a first disk having a plurality of holes, the first disk mounted to the front end portion of the fanout housing, wherein the furcation tubes and optical fibers residing therein are inserted into the holes in the first disk; a second disk with a plurality of holes, the second disk being positioned adjacent and parallel to the first disk, the optical fibers being routed through respective ones of the holes in the second disk; and a plurality of second sealing structures, each of which provides a second seal between the furcation tubes and the first disk. At least a portion of each of the second sealing structures is sandwiched between the first and second disks.

As a third aspect, embodiments of the invention are directed to a fiber optic fanout assembly comprising: a fiber optic trunk cable comprising a plurality of optical fibers within a surrounding jacket; a fanout housing with an internal bore and rear and front end portions, the fanout housing receiving the optical fibers from the fiber optic trunk cable within the internal bore though the rear end portion; a plurality of furcation tubes, each containing one or more of the optical fibers; a first sealing structure that creates a first seal between the fanout housing and the jacket of the fiber optic trunk cable; a first disk having a plurality of holes, the first disk mounted to the front end portion of the fanout housing, wherein the furcation tubes and optical fibers residing therein are inserted into the holes in the first disk, and a plurality of second sealing structures, each of which provides a second seal between the furcation tubes and the first disk. Each of the optical fibers includes a spliced region. The assembly further comprises a generally cylindrical splice holder positioned within the internal bore of the fanout housing, the splice holder including a plurality of longitudinal channels and associated open-ended slots, wherein the spliced regions of the optical fibers reside within respective channels or slots.

DETAILED DESCRIPTION

Figure 1:
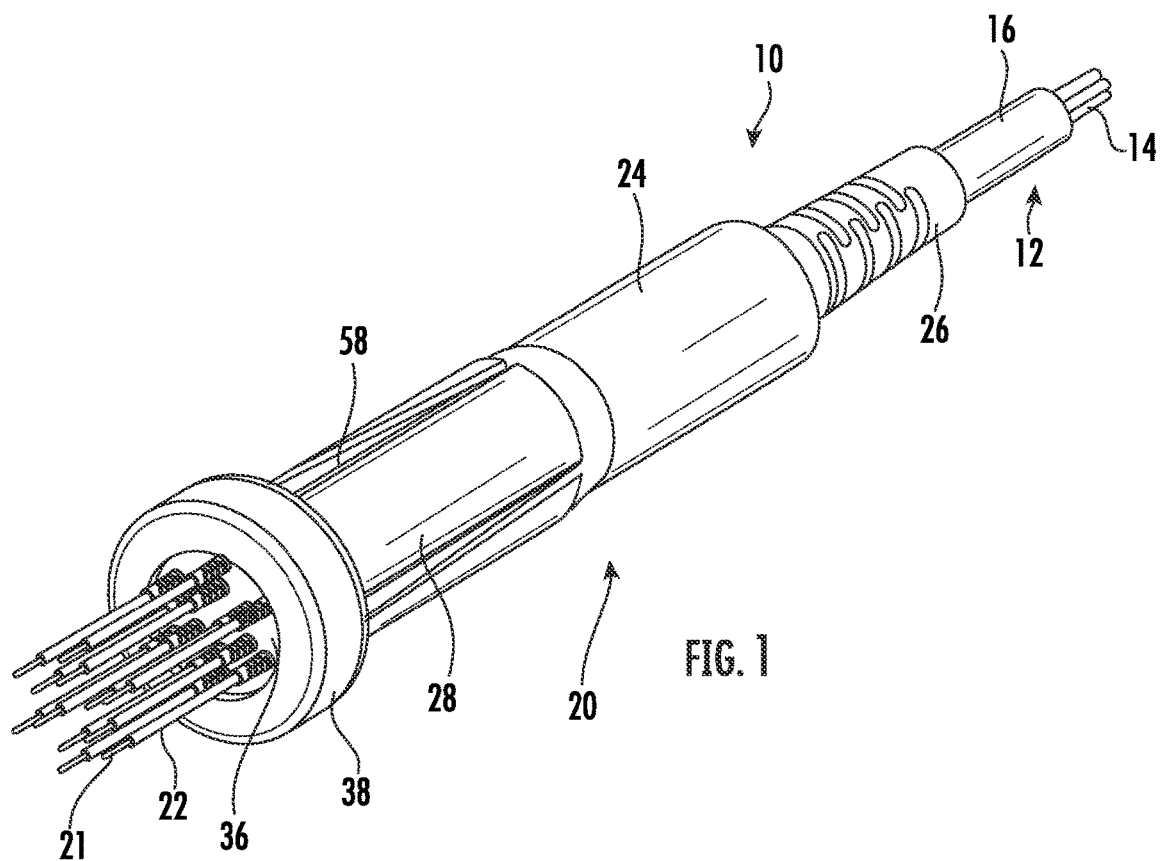
FIG. 1 is a perspective view of an optical fiber breakout assembly according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, a fiber optic cable breakout assembly, designated broadly at 10, is shown in FIGS. 1-11. The assembly 10 includes a fiber optic cable 12 that includes a plurality of optical fibers 14 within a jacket 16. The trunk cable 12 also includes strength members 15. The trunk cable 12 is routed into one end of a breakout unit 20. Furcation tubes 22 exit the opposite end of the breakout unit 20, each protecting one or more optical fibers 21 that are contained therein and that are spliced to the optical fibers 14 to form overall spliced fibers 17. Connectors (not shown) are attached at the ends of the optical fibers 21 opposite the breakout unit 20 for connection with equipment, such as an RRU or an active antenna. The cable 12 and furcation tubes 22 may be of conventional construction and need not be described in detail herein.

Figure 2:
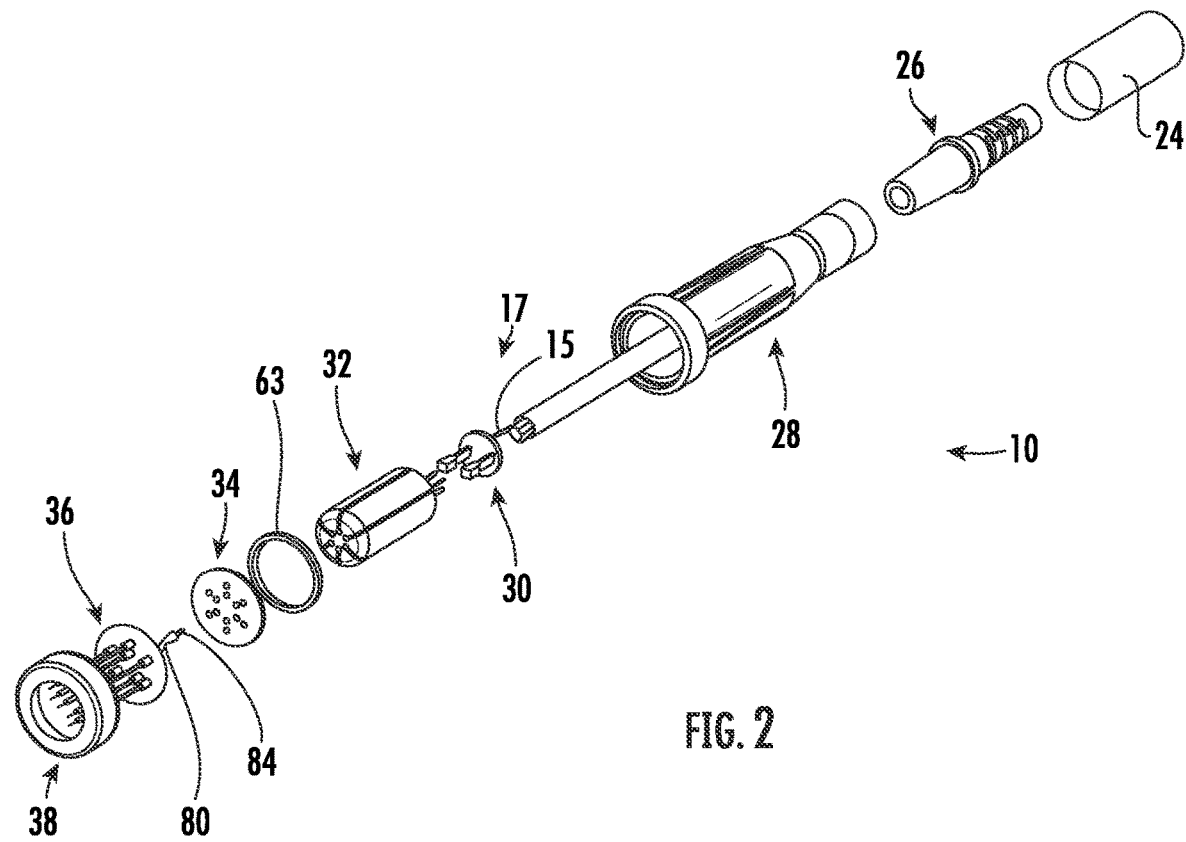
FIG. 2 is an exploded perspective view of the assembly of FIG. 1.

Referring now to FIG. 2, it can be seen that the breakout unit 20 includes a back cap 24, a friction boot 26, a fanout housing 28, a cable stopper 30, a splice holder 32, inner and outer disks 34, 36 and a front cap 38. These components are described in greater detail below.

The back cap 24 (FIG. 5) is generally cylindrical and hollow, with an open forward end and a rear end 39 with a hole 40 that is slightly smaller than the outer diameter of the back cap 24. Threads 42 are present on the inner surface of the back cap 24 near the opening 40. The back cap 24 is typically formed of a polymeric material, such as polycarbonate.

Figure 3:
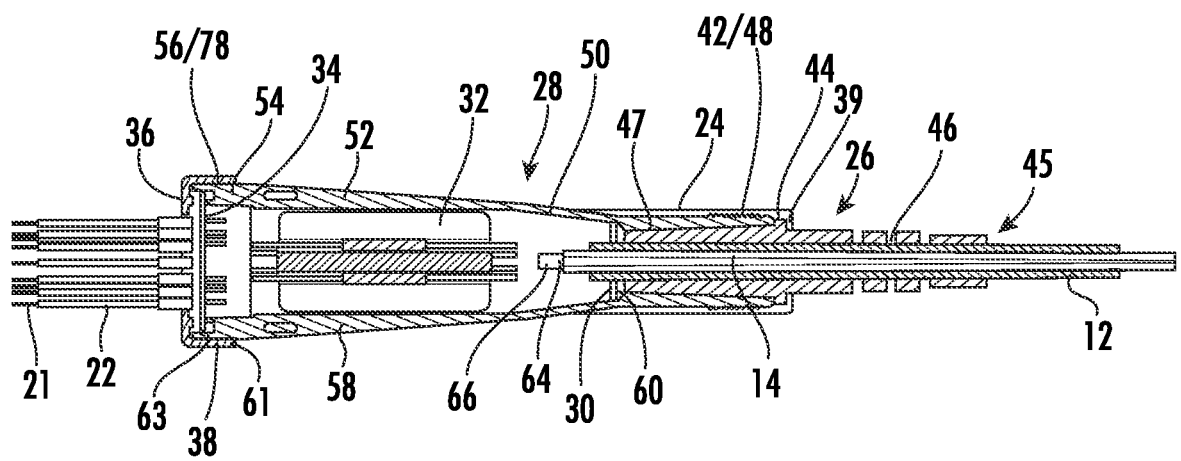
FIG. 3 is a side section view of the fan-out housing and disks of the assembly of FIG. 1.
Figure 4:
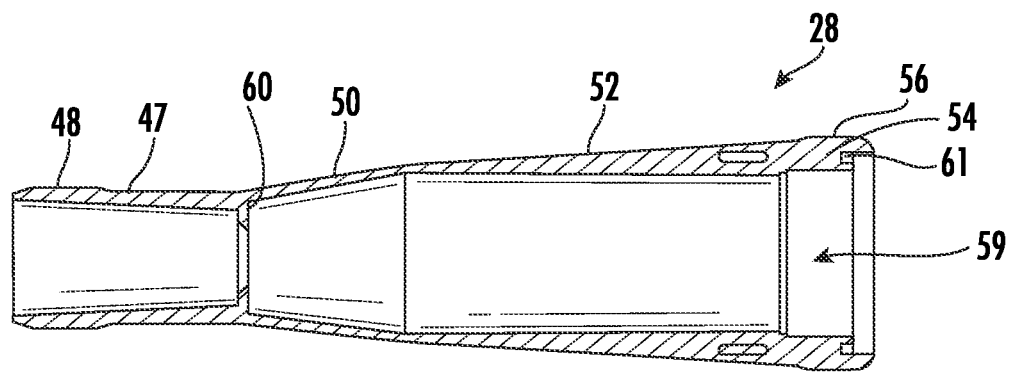
FIG. 4 is a side section view of the fanout housing of the assembly of FIG. 1.

Referring back to FIG. 2 and also to FIG. 3, the friction boot 26 is also generally cylindrical and hollow, having a bore 45. A flange 44 extends radially outwardly from the center of the boot 26. Indentions 46 are located to the rear of the flange 44 to impart flexibility. The front end of the boot 26 is slightly tapered. The boot 26 is typically formed of a flexible material, such as rubber.

The fanout housing 28 (FIGS. 3 and 4) is generally cylindrical, with a narrow rear end 47 with outer threads 48, an angled transition section 50, a larger front section 52, and an expanded coupling section 54 that has outer threads 56. An internal bore 59 extends through the fanout housing 28. Tapered longitudinal ribs 58 extend along the length of the front section 52. The inner surface of the rear end 47 is tapered to generally match the taper of the front end of the boot 26. A partition 60 divides the rear end 47 from the transition section 50. An O-ring groove 61, which is configured to receive an O-ring 63, is positioned within the coupling section 54. The fanout housing 28 is typically formed of a polymeric material, such as polycarbonate.

The cable stopper 30 (FIG. 9) includes a C-shaped base 62 and two arms 64. A strength member screw retainer 66 is mounted at the end of each arm 64. The cable stopper 30 is typically formed of a metallic material.

Figure 6:
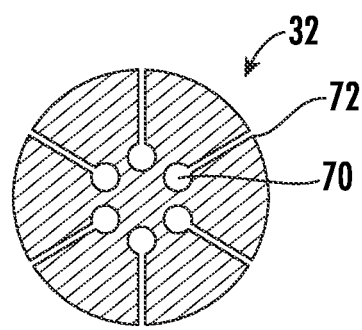
FIG. 6 is a front section view of the splice holder of the assembly of FIG. 1.
Figure 7:
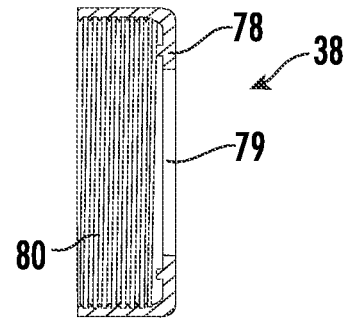
FIG. 7 is a side section view of the front cap of the assembly of FIG. 1.

Referring now to FIGS. 2, 3 and 6, the splice holder 32 is generally cylindrical and is predominantly solid. The splice holder 32 includes a plurality of longitudinal channels 70 near its center. Each of the channels 70 is fed by a slot 72 that extends radially to an open end at the outer surface of the splice holder 70. In the illustrated embodiment, the splice holder 32 has six circumferentially equally-spaced channels 70 and associated slots 72, but this number can vary in other embodiments. The splice holder 32 is typically formed of a light polymeric material, such as styrofoam.

Figure 8:
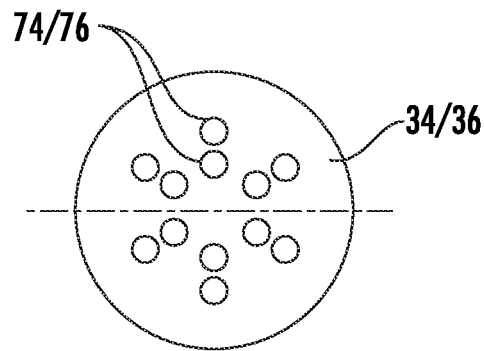
FIG. 8 is a front view of the inner disk of the assembly of FIG. 1.
Figure 9:
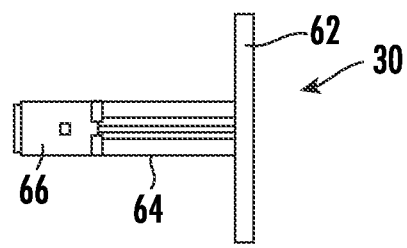
FIG. 9 is a side view of the cable stopper of the assembly of FIG. 1.
Figure 10:
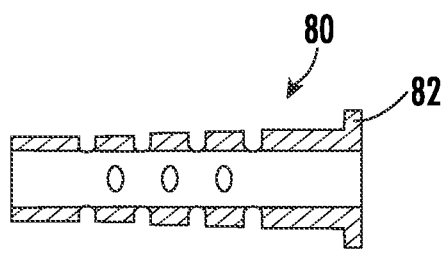
FIG. 10 is a side section view of the boot of the assembly of FIG. 1.
Figure 11:
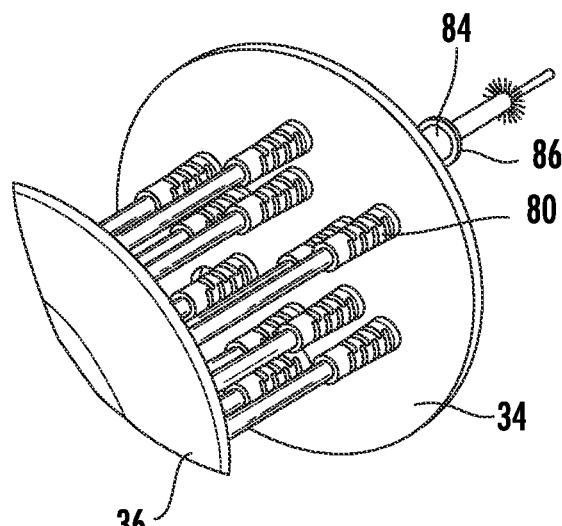
FIG. 11 is an enlarged partial perspective view of the disks, boots and sleeve of the assembly of FIG. 1.
Figure 12:
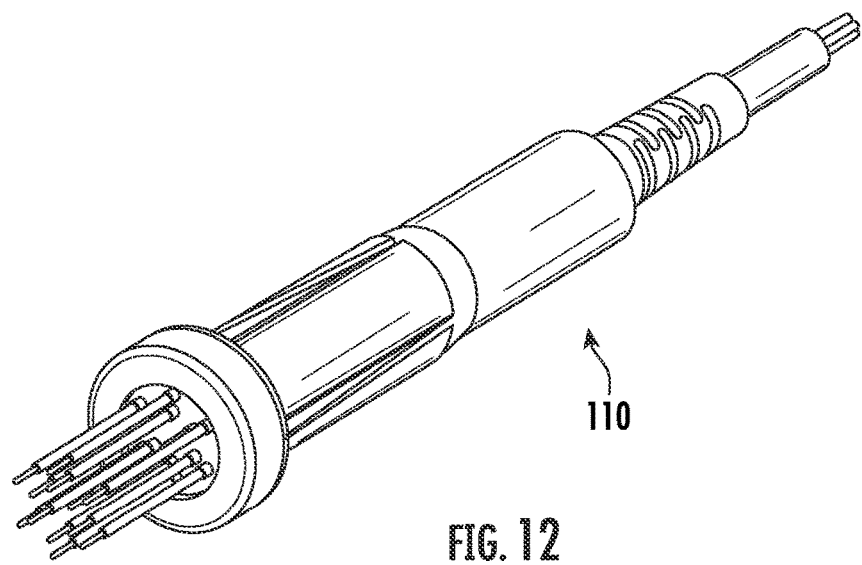
FIG. 12 is a perspective view of an optical fiber breakout assembly according to additional embodiments of the invention.
Figure 13:
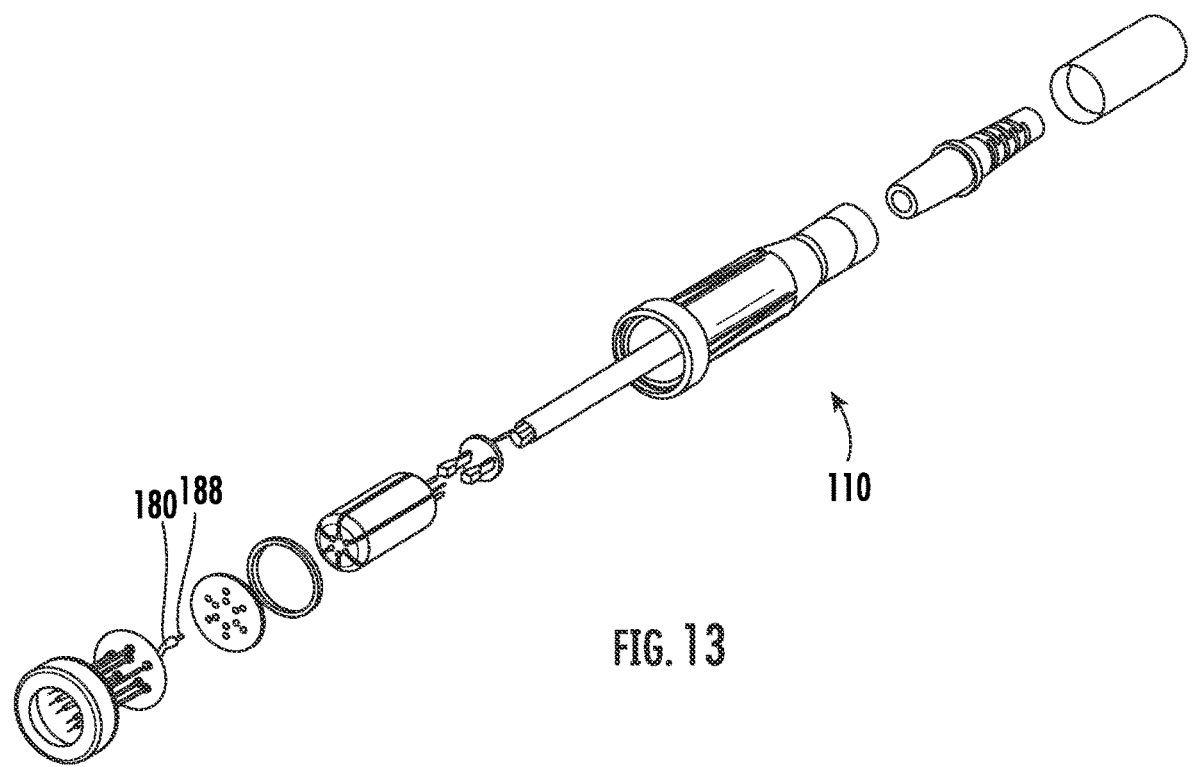
FIG. 13 is an exploded perspective view of the assembly of FIG. 12.
Figure 14:
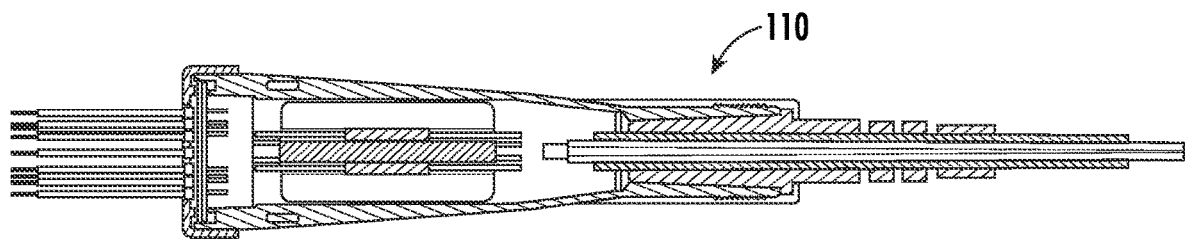
FIG. 14 is a side section view of the assembly of FIG. 12.

Referring now to FIGS. 2 and 8, each of the inner and outer disks 34, 36 is generally circular and flat, although other shapes are contemplated. Each of the disks 34, 36 includes a pattern of holes 74, 76 that, in some embodiments, is similar to the arrangement of channels 70 and slots 72 in the splice holder 32 (for example, there are six pairs of circumferentially equally-spaced holes 74, 76 in each of the inner and outer disks 34, 36). The inner and outer disks 34, 36 may be formed of a variety of materials, but are typically formed of metallic materials.

The front cap 38 (FIG. 7) is generally round and has a lip 78 that encircles an opening 79. Threads 80 are present on the inner surface of the lip 78. The front cap 38 is typically formed of a polymeric material such as polycarbonate.

Figure 5:
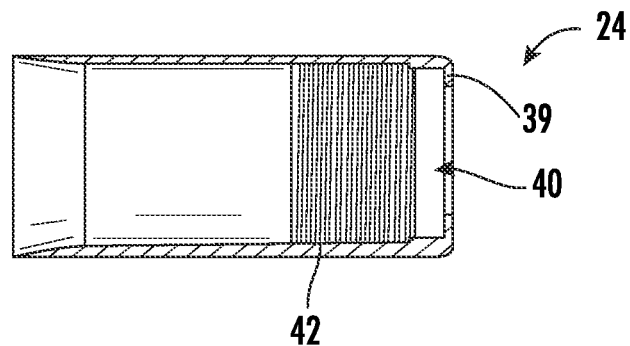
FIG. 5 is a side section view of the rear cap of the assembly of FIG. 1.

The construction of the assembly 10 can be understood by reference to FIGS. 2, 3 and 5. The trunk cable 12 is received in the hole 40 of the back cap 24. The friction boot 26 is inserted through the hole 40 in the back cap 24 so that the rear portion thereof extends rearwardly of the rear end 39 of the back cap 24 and the flange 44 of the friction boot 26 abutting the forward surface of the rear end 39. The forward end of the friction boot 26 fits within the rear end 47 of the fanout housing 28. The back cap 24 is rotated to relative to the fanout housing 28 so that the threads 42 of the back cap 24 mesh with the threads 48 of the fanout housing 28. The interaction between the back cap 24, the friction boot 26, and the fanout housing 28 creates a watertight seal that prevents moisture from entering the interior of the fanout housing 28.

Still referring to FIG. 2 and also to FIG. 5, the cable stopper 30 is lodged against the partition 60 of the fanout housing 28 and secured with two fastite fasteners with the arms 64 extending forwardly. The optical fibers 14 of the trunk cable 12 are routed through the center of the base 62 of the cable stopper 30, and the forward end of the jacket 16 may abut the rear surface of the base 62. The strength members 15 of the cable 12 are attached to the screw retainers 66 at the end of each arm 64. The ends of the optical fibers 14 are thus available for splicing.

Each of the optical fibers 21 is routed through a respective furcation tube 22. A rubber boot 80 with a radial flange 82 (see FIG. 10) and a sleeve 84 (typically formed of KEVLAR polymer) with a flange 86 are positioned near the end of the furcation tube 22, with the boot 80 surrounding the sleeve 84 and the flange 82 abutting the forward surface of the flange 86. The optical fibers 21 are then routed through respective holes 76 in the outer disk 36, so that the flange 82 of the boot 80 contacts the rear surface of the outer disk 36. The rear ends of the optical fibers 21 are routed through respective holes 74 in the inner disk 34, and the inner disk 34 is positioned parallel the outer disk 36 but is spaced from the outer disk 36 by the flanges 82, 86. The flanges 82 are larger in diameter than the holes 74, 76 (see FIG. 11).

The portions of the optical fibers 14 that are routed through the cable stopper 30 are spliced to the portions of the optical fibers 21 that are routed through the inner disk 34. The spliced area of each pair of spliced fibers 14, 21 is inserted into a respective slot 72 of the splice holder 32 (typically the spliced fiber enters the slot 72 radially) and, in some instances, the spliced fibers 14, 21 are further slipped via the slot 72 into the corresponding channel 70. Thus, the spliced area is protected by the splice holder 32, with the optical fibers 14, 21 being routed from the spliced area out of the splice holder 32. The splice holder 32 and its inserted spliced optical fibers 14, 21 are inserted into the front section 52 of the fanout housing 28. The O-ring 63 is fitted into the O-ring groove 61.

The inner and outer disks 34, 36 are then secured in place within the fanout housing 28 with the front cap 38, which is attached by rotating it relative to the fanout housing 28 so that the threads 56 of the coupling section 54 mesh with the threads 78 of the front cap 38. The front cap 38 is tightened sufficiently that watertight seals are formed between the inner disk 34 and the O-ring 33, and between the flanges 82 and the outer disk 36.

The assembly 10 thus provides a watertight cavity within the fanout housing 28 for the spliced optical fibers 14, 21. In addition, the splice protector 32 provides a protective element for the spliced areas of the optical fibers 14, 21. As such, the assembly 10 can provide a suitable watertight optical fanout device without the need for epoxy or some other protective material within the cavity.

Figure 15:
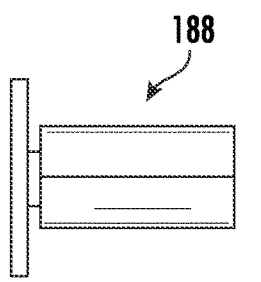
FIG. 15 is side view of a crimp sleeve used with the assembly of FIG. 12.
Figure 16:
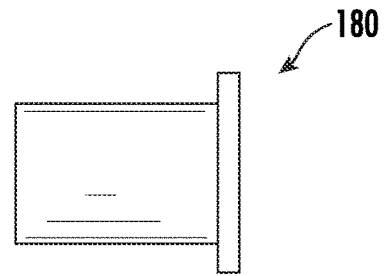
FIG. 16 is a side view of a sealing grommet used with the assembly of FIG. 12.
Figure 17:
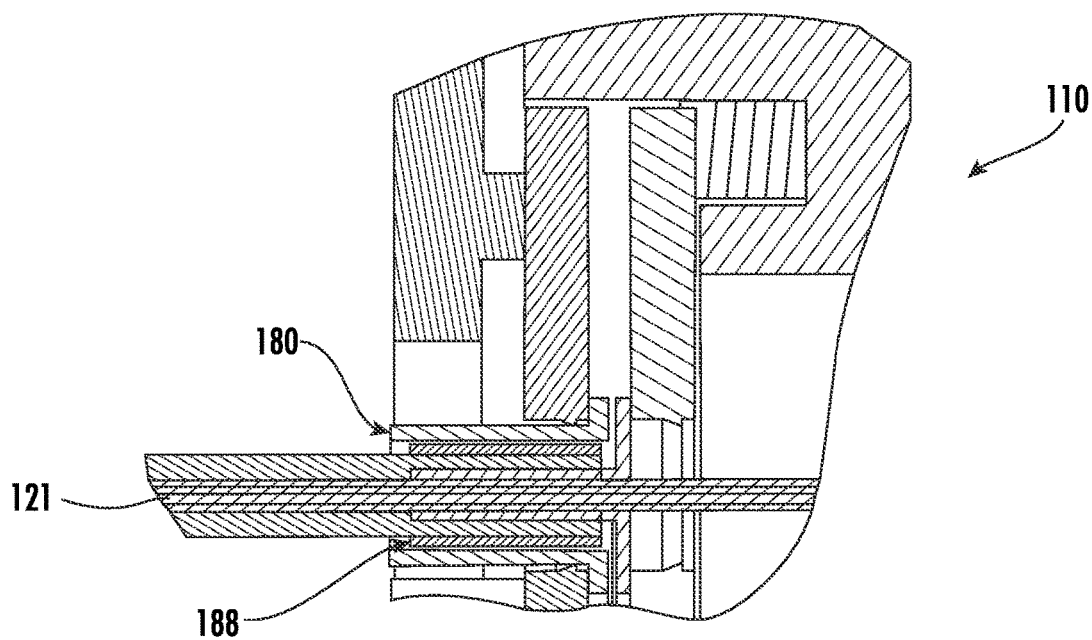
FIG. 17 is a greatly enlarged partial section view of the assembly of FIG. 12 showing the front end of the fanout housing, the inner and outer disks, the sleeves and boot, and the O-ring.

Referring now to FIGS. 12-17, an alternative embodiment of the assembly 10 is shown therein and designated broadly at 110. The assembly 110 is similar to the assembly 10 with the exception that the boots 80 and sleeves 84 are replaced with smaller sealing grommets 180 (FIG. 16) and crimp sleeves 188 (FIG. 15). This is best seen in FIG. 15. The presence of the crimp sleeves 188 enables the fibers 121 to be crimped into place, which can provide a strain relief for the fibers 121.

Those of skill in this art will appreciate that the assembly may take other forms. For example, either or both of the rear and front caps 24, 38 may be secured to the fanout housing 28 via means other than threading, such as locking latches, a bayonet-style rotation fitting, adhesive, or the like. The fanout housing 28 may take a different form; for example, the different sections may vary in length, width, taper, and even cross-sectional profile (e.g., the wider section 52 may be square or rectangular in cross-section). There may be more or fewer optical fibers employed (with the numbers of holes 74, 76 in the inner and outer disks 34,36 and the number of channels 70 and slots 72 in the splice holder 32 being varied accordingly). In some embodiments the overall optical fibers 17 may lack a spliced region. Other variations may also be employed.

Also, the manner of providing sealing may differ. For example, the sealing boots 80, 180 may be replaced by grommets, sleeves, O-rings, and the like. The front end of the boot 26 may be shaped differently, may be augmented by an O-ring, or the like. Other sealing structures may also be used.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A fiber optic fanout assembly, comprising:
   a fiber optic trunk cable comprising a plurality of optical fibers within a surrounding jacket;

a fanout housing with an internal bore and rear and front end portions, the fanout housing receiving the optical fibers from the fiber optic trunk cable within the internal bore though the rear end portion;

a plurality of furcation tubes, each containing one or more of the optical fibers;

a first sealing structure that creates a first seal between the fanout housing and the jacket of the fiber optic trunk cable;

a first disk having a plurality of holes, the first disk mounted to the front end portion of the fanout housing, wherein the furcation tubes and optical fibers residing therein are inserted into the holes in the first disk; and a plurality of discrete and separate second sealing structures, each of which provides a second seal between a respective furcation tube and the first disk, wherein the assembly provides a watertight optical fanout device without epoxy or other protective material within the fanout housing.

2. The fanout assembly defined in claim 1, wherein the first sealing structure comprises a flexible boot that encircles the jacket, extends at least partially into the internal bore of the fanout housing, and engages the rear end portion of the fanout housing.

3. The fanout assembly defined in claim 1, further comprising a second disk having a plurality of holes, the second disk being positioned adjacent and parallel to the first disk, wherein at least a portion of each of the second sealing structures is sandwiched between the first and second disks.

4. The fanout assembly defined in claim 1, wherein each of the optical fibers includes a spliced region, and further comprising a generally cylindrical splice holder positioned within the internal bore of the fanout housing, the splice holder including a plurality of longitudinal channels and associated open-ended slots, wherein the spliced regions of the optical fibers reside within respective channels or slots.

5. The fanout assembly defined in claim 4, wherein the splice holder comprises a polymeric foam material.

6. The fanout assembly defined in claim 1, further comprising an O-ring positioned adjacent the first disk.

7. The fanout assembly defined in claim 1, wherein the second sealing structures comprise flanged boots.

8. The fanout assembly defined in claim 1, further comprising a front cap that engages the front end portion of the fanout housing and secures the first disk to the fanout housing.

9. The fanout assembly defined in claim 1, further comprising a rear cap that engages the rear end portion of the fanout housing and secures the first sealing structure to the fanout housing.

10. The fanout assembly defined in claim 1, wherein the fiber optic cable comprises a strength member, and further comprising a cable stopper, wherein the strength member is attached to the cable stopper.

11. The fanout assembly defined in claim 1, further comprising a plurality of crimp sleeves, each engaging a respective furcation tube and the first disk.

12. A fiber optic fanout assembly, comprising:
a fiber optic trunk cable comprising a plurality of optical fibers within a surrounding jacket;

a fanout housing with an internal bore and rear and front end portions, the fanout housing receiving the optical fibers from the fiber optic trunk cable within the internal bore though the rear end portion;

a plurality of furcation tubes, each containing one or more of the optical fibers separated from the fiber optic trunk cable;

a first sealing structure that creates a first seal between the fanout housing and the jacket of the fiber optic trunk cable;

a first disk having a plurality of holes, the first disk mounted to the front end portion of the fanout housing, wherein the furcation tubes and separated optical fibers residing therein are inserted into the holes in the first disk;

a second disk with a plurality of holes, the second disk being positioned adjacent and parallel to the first disk, the separated optical fibers being routed through respective ones of the holes in the second disk;

a plurality of second sealing structures, each of which provides a second seal between the furcation tubes and the first disk; and wherein at least a portion of each of the second sealing structures is sandwiched between the first and second disks.

13. The fanout assembly defined in claim 12, wherein each of the optical fibers includes a spliced region, and further comprising a generally cylindrical splice holder positioned within the internal bore of the fanout housing, the splice holder including a plurality of longitudinal channels and associated open-ended slots, wherein the spliced regions of the optical fibers reside within respective channels or slots.

14. The fanout assembly defined in claim 13, wherein the splice holder comprises a polymeric foam material.

15. The fanout assembly defined in claim 12, further comprising an O-ring positioned adjacent the first disk.

16. The fanout assembly defined in claim 12, wherein the second sealing structures comprise flanged boots.

17. The fanout assembly defined in claim 12, further comprising a front cap that engages the front end portion of the fanout housing and secures the first disk to the fanout housing.

18. The fanout assembly defined in claim 12, further comprising a rear cap that engages the rear end portion of the fanout housing and secures the first sealing structure to the fanout housing.

19. The fanout assembly defined in claim 12, wherein the fiber optic cable comprises a strength member, and further comprising a cable stopper, wherein the strength member is attached to the cable stopper.

20. A fiber optic fanout assembly, comprising:
a fiber optic trunk cable comprising a plurality of optical fibers within a surrounding jacket;

a fanout housing with an internal bore and rear and front end portions, the fanout housing receiving the optical fibers from the fiber optic trunk cable within the internal bore though the rear end portion;

a plurality of furcation tubes, each containing one or more of the optical fibers;

a first sealing structure that creates a first seal between the fanout housing and the jacket of the fiber optic trunk cable;

a first disk having a plurality of holes, the first disk mounted to the front end portion of the fanout housing, wherein the furcation tubes and optical fibers residing therein are inserted into the holes in the first disk; and a plurality of second sealing structures, each of which provides a second seal between the furcation tubes and the first disk;

wherein each of the optical fibers includes a spliced region, and further comprising a generally cylindrical splice holder positioned within the internal bore of the fanout housing, the splice holder including a plurality of circumferentially equally-spaced apart longitudinal channels and associated open-ended slots, wherein the spliced regions of the optical fibers reside within respective channels or slots.

* * * * *